Jan. 26, 1954

O. E. ANDERSON 2,667,010

RECEPTACLE FOR SNELLED FISHHOOKS

Filed Nov. 18, 1949

Inventor
ORRIN E. ANDERSON

By McMorrow, Berman + Davidson
Attorneys

Patented Jan. 26, 1954

2,667,010

UNITED STATES PATENT OFFICE 2,667,010

RECEPTACLE FOR SNELLED FISHHOOKS

Orrin Elwood Anderson, Philadelphia, Pa.

Application November 18, 1949, Serial No. 128,113

2 Claims. (Cl. 43—57.5)

This invention relates to a receptacle for snelled fish hooks, and more particularly to an improved receptacle of the type having means for holding a number of hook and snell assemblies in spaced apart position relative to each other.

It is among the objects of the invention to provide a receptacle or container for snelled fish hooks which will support a large number of hook and leader or snell assemblies therein, in entirely separated relationship, and so that any selected assembly can be removed from the receptacle without in any way disturbing any of the other assemblies therein, and which receptacle is buoyant so that it will float in water, is simple and durable in construction and economical to manufacture, is neat and attractive in appearance, and can be easily opened and closed to expose and enclose the hook and snell assemblies mounted therein.

Other objects and advantages will become apparent from a consideration of the following description and the appended claims in conjunction with the accompanying drawing wherein:

Figure 1:
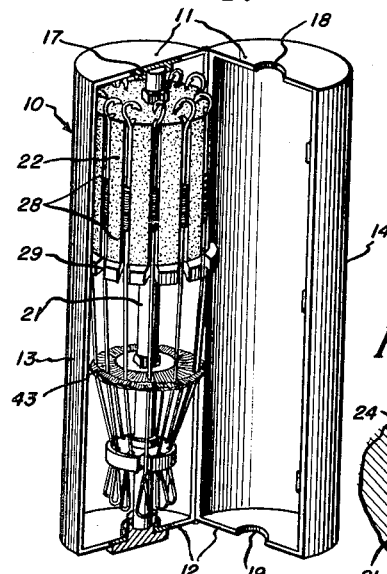
Figure 1 is a perspective view of a snelled hook receptacle illustrative of the invention with the receptacle shown in open condition.
Figure 2:
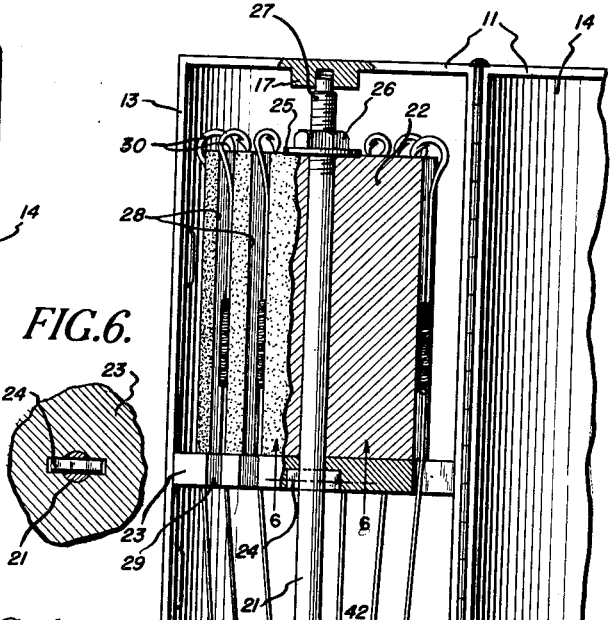
Figure 2 is an elevation on a somewhat enlarged scale of the receptacle, illustrating the receptacle in fully opened condition.
Figure 6:
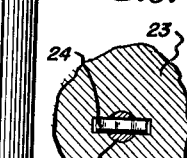
Figure 6 is a cross section of a fragmentary portion of the receptacle taken on the line 6—6 of Figure 2.
Figure 3:
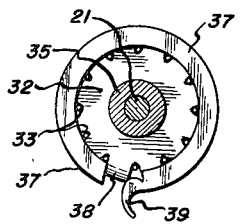
Figures 3 and 4 are both cross-sectional views on the line 3—3 of Figure 2 with the parts shown in somewhat different operative positions in the two figures.
Figure 4:
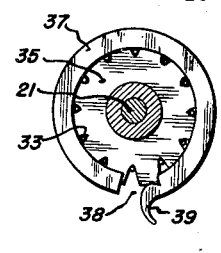

With continued reference to the drawing, the receptacle comprises an elongated, hollow, cylindrical casing, generally indicated at 10, having end walls 11 and 12 at its respectively opposite ends and formed in two semicylindrical sections 13 and 14. The sections 13 and 14 are hinged together along corresponding edges by a suitable hinge, such as the piano type hinge 15, particularly illustrated in Figure 2, and the sections are movable about the hinge connection therebetween between an open position in which their open sides are substantially in a common plane, as illustrated in Figure 2, and a closed position in which their hinged edges and their edges opposite such hinged edges are registered and substantially in contact.

Suitable latch means, such as the leaf springs 16, are secured to one of the sections of the cylindrical casing opposite the hinged edge of such section, and these springs engage with detents provided on the other section of the casing to releasably secure the two sections of the casing together in closed position.

A hollow boss 17 is provided on the inner side of the end wall of the casing section 13 in position such that it is centrally disposed relative to the closed casing, and a recess 18 is provided in the corresponding end wall of the other section 14 to receive this boss when the two sections of the casing are in closed relationship.

An internally screw threaded boss 18' projects inwardly from the portion of the end wall 12 of the casing section 13 in position such that it is centrally disposed relative to the end wall 12 of the closed casing, and the end wall carried by the section 14 is provided with a recess 19 which receives the boss 18' when the sections 13 and 14 are in closed relationship.

A socket nut 20 is threaded into the boss 18' and this socket nut and the boss 17 provide sockets which receive the respectively opposite ends of a rod 21 which extends within the casing between the end walls 11 and 12.

A solid cylindrical body 22 of easily penetrable material, such as cork, is mounted on the rod 21 near the boss 17, the longitudinal center lines of the cylindrical body 22, the rod 21 and the cylindrical casing 10 being substantially coincident when the casing is closed.

The cylindrical body 22 has a length materially shorter than one-half the length of the rod 21 and not much longer than the shanks of the fish hooks to be mounted in the receptacle. A disc 23, preferably of metal, concentrically surrounds the rod 21 and bears against the end of the body 22 remote from the boss 17 and is positioned longitudinally of the rod by suitable means, such as the key 24 extending transversely through the rod and received in a recess in the surface of the plate 23 opposite the body 22. A washer 25 surrounds the rod 21 at the end of the body 22 opposite the disc 23, and a nut 26 threaded onto the externally screw threaded end portion 27 of the rod bears on the washer 25 and clamps the body 22 between the washer and the disc 23.

The body 22 is provided in its peripheral surface with angularly spaced apart, longitudinally extending grooves 28 which grooves are continued through the peripheral edge portion of the disc 23, as indicated at 29, and receive the shanks of hooks 30, the points of which are embedded in the end of the body 22 opposite the disc 23. The snells 31 extend from the ends of the hook shanks opposite the hook points longitudinally of the casing, and a disc 32 is secured on the rod at a location spaced from the disc 22 and is provided in its peripheral edge portion with notches 33 which receive the snells 31 near the ends of the snells opposite the hooks 30.

The rod 21 is provided with an externally screw threaded portion 34 which extends from the end of the rod adjacent to the boss 18' to the mid-length location of the rod, and the disc 32 has an internally screw threaded hub 35 which is threaded onto the screw threaded portion 34 of the rod, so that the disc can be adjusted longitudinally of the rod to accommodate the receptacle to different lengths of snells. A lock nut 36 threaded on the rod at one side of the disc 32 serves to lock the disc in adjusted position along the rod.

A thin walled, annular guard 37 of channel cross section marginally surrounds the disc 32 and receives the peripheral edge thereof to cover the notches and is rotatable on the disc. This guard has, at one side, a discontinuity 38 which can be selectively brought into registry with the various notches 33 so that the snell of any desired hook and snell assembly can be freed for removal from the receptacle. At one side of the discontinuity 38 the guard is provided with an outwardly extending tongue 39 engageable by a finger to rotate the guard on the disc 32.

A third or intermediate disc 40 is provided with a central aperture which slidably receives the rod 21 and this disc is adjustably positioned longitudinally of the rod by two nuts 41 and 42 threaded onto the rod at respectively opposite sides of the disc 40. An annular row 43 of bristles is secured in the disc 40 and projects radially from the periphery of the disc to engage the snells 31 and hold these snells in spaced apart relationship between the body 22 and the disc 32. The discs 23, 40, and 32 are progressively smaller in diameter so that the snells are held in a cone and intermediate portions of the snells are forced to bear against the bristles 43 on the intermediate disc 40 as to be securely retained in position.

Figure 8:
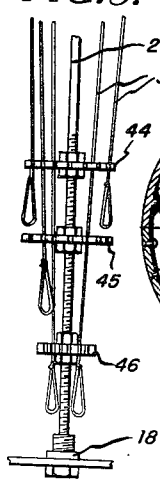
Figure 8 is an elevation of a fragmentary portion of a modified form of hook and snell support for the snelled fish hook receptacle.
Figure 5:
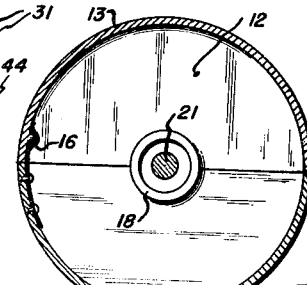
Figure 5 is a cross section on the line 5—5 of Figure 2 of the receptacle when in closed condition.
Figure 7:
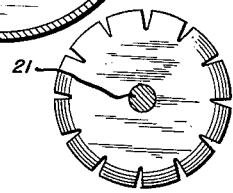
Figure 7 is a view similar to Figures 3 and 4, but showing a somewhat modified component of the receptacle.

In order to assemble the receptacle, the disc 23, cylinder 22, nut 26, disc 40, nuts 41 and 42, disc or holder 32 and lock nut 36 are all assembled on shaft 21, and the end of shaft 21 adjacent holder 32 is then inserted through boss 18 with socket nut 20 removed. The opposite end of the shaft is then brought within the casing part 13 and inserted in boss 17 after which nut 20 is threaded into boss 18 to receive the adjacent end of the shaft. The shaft is then rotatably supported at its ends in boss 17 and socket nut 20.

Where it is desired to mount snelled hooks having snells of different lengths in the container, the guard 37 may be omitted and two or more discs, as indicated at 44, 45 and 46 in Figure 8, may be mounted on the rod 21 at respectively different distances from the body 22 and these discs are provided with peripheral notches which are sufficiently narrow, as particularly illustrated in Figure 7, to bindingly engage the snells near the ends of the latter remote from the corresponding hooks.

The hooks are mounted in the receptacle by placing the hook shanks in the grooves 28 in the body 22 and engaging the hook points in the end of the body adjacent the end wall 11 of the casing. The hook snells are then drawn in a direction away from the hooks through the grooves 29 in the disc 23, through the bristles 43 on the disc 40 and are then engaged near their ends opposite the hooks in the notches 33 of the disc 32, the shaft, cylinder and disc assembly being rotated to bring the grooves and notches to the open side of the casing part in which the assembly is mounted. If the guard 37 is used, the guard will be progressively rotated around the disc 32 as the snells are engaged in the notches progressively around this disc. After all of the hooks are mounted in the receptacle, the two parts of the receptacle are snapped together and the hooks may then be transported without becoming entangled with each other, in the clothing or other property of the person carrying the hooks, and are maintained in a free and straight condition for use.

The hook and snell assemblies may be removed by an obvious reversal of the mounting operation described above.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a receptacle for fish hooks having barbed crooks and snells, a rod, an elongated cylindrical body of penetrable material axially circumposed on said rod adjacent one end of said rod, said cylindrical body having a first end spaced from said one end of the rod and being formed with circumferentially spaced longitudinal grooves, the barbed crooks of hooks being adapted to be impaled in said first end of the cylindrical body with the shanks of the hooks engaged in said grooves, said cylindrical body having a second end, a first disc circumposed on said rod and engaging said second end of said cylindrical body, said first disc being formed with peripheral notches registered with the grooves of said cylindrical body for receiving portions of snells of hooks; a second disc circumposed on said rod adjacent the other end thereof, said second disc being substantially smaller in diameter than said first disc, said second disc being formed with peripheral notches for receiving portions of snells of hooks engaged in the notches of the first disc; an intermediate disc circumposed on said rod at a point between and spaced from said first and second discs, said intermediate disc being smaller in diameter than said first disc and larger in diameter than said second disc, an annular row of bristles on and projecting radially outwardly from the periphery of said intermediate disc for engaging and positioning portions of snells between the portions engaged in the notches of said first and second discs, and retaining means on said second disc for releasably holding snells in the notches of said second disc.

2. In a receptacle for fish hooks having barbed crooks and snells, a rod, an elongated cylindrical body of penetrable material axially circumposed on said rod adjacent one end of said rod, said cylindrical body having a first end spaced from said one end of the rod and being formed with circumferentially spaced longitudinal grooves, the barbed crooks of hooks being adapted to be impaled in said first end of the cylindrical body with the shanks of the hooks engaged in said grooves, said cylindrical body having a second end, a first disc circumposed on said rod and engaging said second end of said cylindrical body, said first disc being formed with peripheral notches registered with the grooves of said cylindrical body for receiving portions of snells of hooks, a second disc circumposed on said rod adjacent the other end thereof, said second disc being substantially smaller in diameter than said first disc, said second disc being formed with peripheral notches for receiving portions of snells of hooks engaged in the notches of the first disc, an intermediate disc circumposed on said rod at a point between and spaced from said first and second discs, said intermediate disc being smaller in diameter than said first disc and larger in diameter than said second disc, an annular row of bristles on and projecting radially outwardly from the periphery of said intermediate disc for engaging and positioning portions of snells between the portions engaged in the notches of said first and second discs, and retaining means on said second disc for releasably holding snells in the notches of said second disc, said retaining means comprising a discontinuous ring of channel cross section surrounding said second disc and rotatably receiving the peripheral edge portion of said second disc.

ORRIN ELWOOD ANDERSON.

References Cited in the file of this patent

UNITED STATES PATENTS

| Number | Name | Date |
|---|---|---|
| 742,040 | Kurtz | Oct. 20, 1903 |
| 2,158,947 | Purdum | May 16, 1939 |
| 2,225,309 | Lawrence | Dec. 17, 1940 |
| 2,232,171 | Fleenor | Feb. 18, 1941 |
| 2,525,057 | Anderson | Oct. 10, 1950 |

FOREIGN PATENTS

| Number | Country | Date |
|---|---|---|
| 18,554 | Great Britain | of 1913 |
| 619,163 | Great Britain | of 1949 |